Feb. 11, 1969   D. B. SHELDAHL   3,427,414
SWITCH ASSEMBLY FOR DETECTING UNDERGROUND LEAKS
Filed Jan. 13, 1967
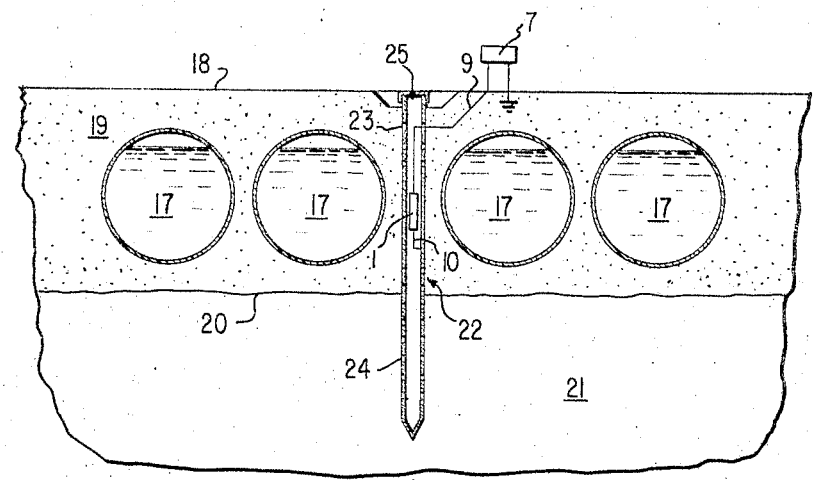
FIG. 3
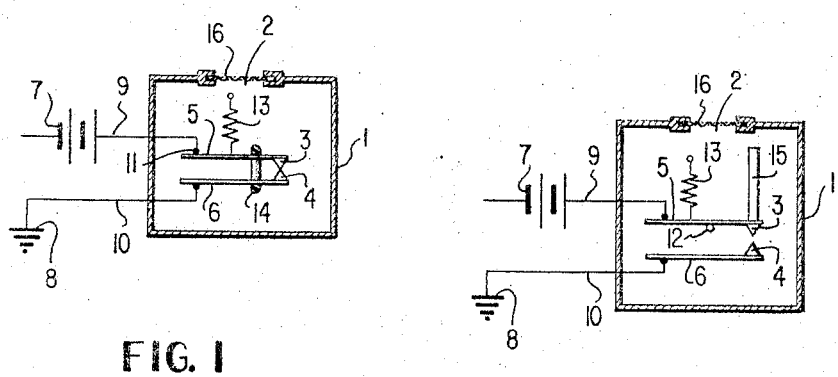
FIG. 1
FIG. 2
INVENTOR
DAVID B. SHELDAHL
BY McLean, Morton, & Boustead
ATTORNEYS.

United States Patent Office 3,427,414
Patented Feb. 11, 1969

3,427,414
SWITCH ASSEMBLY FOR DETECTING UNDERGROUND LEAKS
David B. Sheldahl, Griffith, Ind., assignor to Sinclair Research, Inc., New York, N.Y., a corporation of Delaware
Filed Jan. 13, 1967, Ser. No. 609,059
U.S. Cl. 200—61.04                                        6 Claims
Int. Cl. H01h 35/34

ABSTRACT OF THE DISCLOSURE

An improved electrical safety switch assembly for detecting the leakage of hydrocarbon fluids from underground storage tanks. The assembly is composed of partially perforated housing and electrical circuit means including a switch disposed within the perforated housing which comprises a pair of oppositely disposed electrical contact points, spring means operatively attached to one of the contact points for moving the contact points between an operative position and an inoperative position, and elastomer restraining means operatively secured to at least one of such contact points and held in tension and capable of swelling upon contact with a hydrocarbon fluid. Swelling of the elastomer permits the spring means to move the contact points to the other of said inoperative and operative positions, thereby detecting the leakage or presence of hydrocarbon liquids and vapors.

---

This invention relates to a novel electrical safety switch assembly and its use in the detection of leaks in underground tanks.

Leaks in underground hydrocarbon-containing tanks generally go undetected for a long period of time, and are generally not discovered until a considerable hazard is created by the leaking of hydrocarbons into sewers, residence basements, and other areas where hydrocarbons may tend to settle. Along with the hazard created is the considerable loss of hydrocarbons which can be a substantial financial burden. In an effort to alleviate this problem, it has been suggested to place underground hydrocarbon storage tanks in closed cement vaults. This solution is, however, impractical since it substantially increases the cost of underground storage. Another suggestion has been to use leak-sensing devices that turn on a light, ring a bell, or start and stop motors. An example of such a device is a humidistat wherein a strand of hair which reacts to changes in moisture in the atmosphere is used to open or close a micro-switch. Examples of other types of sensing devices are disclosed in U.S. Patents 2,386,412 and 2,432,367. A safety device used to detect leaks in gasoline-burning heaters is disclosed in U.S. Patent 2,386,412. This leak detector has a spring held in a coiled position by adhesive tape which weakens upon contact with gasoline and fails, causing the spring to actuate an electrical circuit indicating the presence of a leak. This type of switch is disadvantageous since the adhesive tends to dry and harden in time and become gasoline insoluble. Also, the springs must be protected from environmental conditions to prevent corrosion which hinders their function. U.S. Patent 2,432,367 also discloses a device used to detect hydrocarbon leaks, e.g. from fuel tank compartments in airplanes or motor boats, etc., which includes a switch. This switch tends to close when an elastomer interconnected therewith swells on contact with gasoline. Reliance upon swelling alone, however, produces a slow reaction to hydrocarbon leaks. Also, it has been determined that to create a fail-safe condition it is preferable to have a current moving through the leak detector switch at all times with the alarm being sounded as the circuit is broken by some means.

The present invention is directed to an improved electrical safety switch assembly for detecting hydrocarbon leaks from underground tanks which obviate many of the disadvantages of the prior constructions. In this assembly, an electrical switch is disposed within a partially perforated tube located in close proximity to the buried tanks which may advantageously extend from the surface of the ground to the permanent water table beneath the tanks. The electrical switch is preferably composed of a pair of oppositely disposed electrical contact points held in a closed position by an elastomer band so that the current is moving through the switch at all times and the alarm is sounded when the circuit is broken. The elastomer is selected so that when hydrocarbons leaking from surrounding tanks cause sufficient accumulation of hydrocarbon, liquid or vapor, within the tube, the elastomer will swell and lose its tension allowing the elastical switch to open and break the electrical circuit and sound the alarm. This device can easily be withdrawn for examination, replacement or reconditioning after the alarm has been sounded and it can then be readily determined if the switch closed because of deterioration of the elastomer caused by a hydrocarbon leak, or for some other reason.

The tube within which the electrical switch is disposed is generally made up of small diameter pipes and fittings, say for example, pipes with a diameter about 1 to 3 inches, which acts to protect the electrical switch from contaminating soil while at the same time permitting escaping hydrocarbons free access for contact with the electrical switch. For example, one type of tube which can be used may be one containing a gas-tight quick opening cap at the surface of the ground, a porous section just beneath the surface of the ground which can be covered with a fine mesh screen, an impermeable section of tubing which normally contains the electrical switch, followed by another porous section which can also be covered with a fine mesh screen and which can extend into the normal water table. Thus, hydrocarbon which spills within the sand back-fill areas of the tank bed will cause liquid to collect on the water table and eventually in the perforated end of the tube. Hydrocarbon gases will also penetrate the sand and subsequently the air within the upper portion of the tube. Sand which penetrates the screens and perforated portions of the tube can be readily pumped out if it creates a problem.

The device of the present invention has uses other than leak detection. For example, in the event of minor spills, some hydrocarbon fumes will be present in the ground around the submerged tanks. These fumes can be readily released from the ground by using the submerged tube as a vent. A slow stream of fresh air can, if desired, be introduced into the tube through an air hose to dilute and carry out the hydrocarbon vapors before they collect in nearby sumps or basements.

The invention will be better understood by reference to the accompanying drawing wherein—

FIGURE 1 is a schematic representation of an embodiment of an electrical switch in accordance with the present invention with a closed, signal-inoperative position;

FIGURE 2 is a modification of the electrical switch having an opened, signal-inoperative position; and FIGURE 3 is a cross-sectional view of a hydrocarbon storage installation in which the switch of the present invention can be employed.

Referring now to FIGURES 1 and 2 casing 1 encloses the electrical switch and may be, for example, a plastic or metallic box having an opening 2 which permits entry of the hydrocarbon. Opening 2 is preferably closed with the screen 16 to prevent entry of solid contaminants such as sand, dirt, etc. The electrical switch in casing 1 comprises a pair of contact points 3 and 4 supported by conductive means 5 and 6, respectively, which are connected to opposite sides of an electric source 7 through ground 8 by leads 9 and 10. In the modification shown in FIGURE 1, the circuit is completed by a relay, not shown, which is inactive when the circuit is closed, but which, when the points 3 and 4 are separated, becomes activated to cause an audible or visible signal. In the modification of FIGURE 2, the signal device may be connected directly into the circuit so that it will be activated on contact between the points 3 and 4.

Conductive means 5 and 6 are capable of relative movement therebetween. Advantageously, means 6 can be held stationary while means 5 can fulcrum around a point 11, see FIGURE 1, or point 12, see FIGURE 2. Spring 13 in each modification is held by means 5 in a state of tension which is equalized by a restraining means. In FIGURE 1, this restraining means is collar 14, while in FIGURE 2, this restraining means is a cord or band 15. The restraining means holds the contact points in the illustrated position against the tension of spring 13, and is made up of a material which swells or deteriorates on contact with liquid or vaporous hydrocarbons. Any elastomer such as for example butyl rubber or any other rubber which is inert to normal environmental conditions and which will swell or deteriorate on contact with hydrocarbons can be used to make the collar or cord restraining elements 14 and 15 of the present invention. Table I presents the results of several experiments conducted with small rectangular pieces of butyl rubber exposed at room temperature to various media for 24 hours.

TABLE I

| Sample | Dimensions (inches) before exposure | Test Medium | Dimensions (inches) after exposure |
|---|---|---|---|
| A | 0.665 x 0.410 x 0.091 | Gasoline | 0.865 x 0.482 x 0.135 |
| B | 0.660 x 0.400 x 0.089 | Gasoline and wet soil | 0.795 x 0.476 x 0.125 |
| C | 0.663 x 0.411 x 0.093 | Water | 0.641 x 0.400 x 0.085 |
| D | 0.670 x 0.420 x 0.097 | Gasoline vapors | 0.685 x 0.415 x 0.100 |

It can be seen from Table I that contact of butyl rubber with a liquid hydrocarbon, such as gasoline, either alone or in conjunction with wet dirt causes considerable swelling, e.g. up to about 20 percent of the butyl rubber, which allows operation of the electrical switch. After removal from the test media the pieces of rubber returned to their original size in about 24 hours, showing that switch replacement may or may not be required after each leak detection if butyl rubber is used as the switch restraining means. Durometer tests for determining the softening effect of various media on butyl rubber samples show an average reading on the butyl rubber both before and after exposure to water of 65. The rubber upon exposure to gasoline vapors exhibits some swelling with a reading of 48; on exposure to wet soil and gasoline exhibits a reading of 35 and upon exposure to gasoline alone produces an average durometer reading of 30.

It can be readily seen that in the modification of FIGURE 1, deterioration of the collar 14 with the consequent loss of tensile strength allows spring 13 to pivot means 5 around point 11 causing points 3 and 4 to separate, opening the circuit and causing the relay to activate a signal. Likewise, in the modification of FIGURE 2, a deterioration in cord 15 allows the spring 13 to pivot means 5 around point 12, causing contact between points 3 and 4 and thereby activating the alarm.

FIGURE 3 shows a hydrocarbon tank installation incorporating the safety switch of the present invention which includes tanks 17 buried below ground level 18 and surrounded by a sand backfill 19. The normal level of the water table is indicated at 20. Extending through the sand backfill 19 and into the supporting ground 21 is tube or conduit 22 within which the electrical switch is disposed. Advantageously, tube 22 is provided with upper and lower perforated portions 23 and 24, respectively, and has at its top a gas-tight cap 25. The perforations in sections 23 and 24 are such as to prevent passage of sand while permitting hydrocarbon fluid entry and exit. Alternatively, larger perforations may be used in these sections but in such cases the sections are generally covered by a fine-mesh screen such as screen 16. Leaks from tanks 17 cause hydrocarbons to accumulate above the water level 20 in sand bed 19. When sufficient hydrocarbon accumulates or when the water level rises due to heavy rains, the switch in casing 1, disposed within pipe 22, is immersed in the hydrocarbon which enters openings 23 or 24 and opening 2 in casing 1. The hydrocarbon causes collar 14 or cord 15 to swell or deteriorate and thereby actuate the signal.

A switch connected to electrical leads was encased in a piece of tubing using a butyl rubber O-ring as the restraining means. The switch assembly was then exposed to various media. In less than 10 minutes, when immersed in either gasoline or a mixture of wet soil and gasoline the butyl rubber expanded sufficiently to actuate an alarm.

While the leak detection device of the present invention has been particularly described as applicable to the detection of hydrocarbon leakage, such as, for example, gasoline, it may also be employed to detect the leakage of other fluids. For example, it may be used to detect leakage of water and various other liquids by selecting a suitable restraining means capable of swelling upon contact with the liquid whose leakage is to be detected. Also, the device can be made sufficiently sensitive so that it can be used to detect the leakage or presence of vapors and gases as shown in Table I. Thus, by a suitable proportioning and adjustment of the parts, the forms of the device shown in FIGURES 1 to 3 and described above, can be used to detect the leakage or presence of principally hydrocarbon, liquids and vapors, and also other liquid and gaseous materials which can be stored underground in tanks.

It is claimed:

1. An electrical safety switch assembly for detecting the leakage of hydrocarbon fluids from underground storage tanks which consists essentially of a partially perforated housing, electrical circuit means adapted to be connected with a source of power and signal means, said circuit means including a switch disposed within said housing comprising a pair of oppositely disposed electrical contact points, spring means operatively attached to one of said contact points for moving said contact points between two positions comprising an operative position and an inoperative position, and elastomer restraining means operatively secured to at least one of said contact points and held in tension and capable of swelling upon contact with a hydrocarbon fluid holding said contact points in one of the inoperative and operative positions and upon swelling permitting said spring means to move said contact points to the other of said inoperative and operative positions.

2. The device of claim 1 wherein the elastomer restraining means is butyl rubber.

3. The switch of claim 1 wherein said contact points are held in a closed position by the elastomer restraining means and said elastomer restraining means is held in tension by the spring means, said spring means opening said contact points upon swelling of said elastomer restraining means.

4. The device of claim 3 wherein the elastomer restraining means is butyl rubber.

5. The switch of claim 1 wherein said contact points are held in an open position by the elastomer restraining means and said elastomer restraining means is held in tension by the spring means, said spring means closing said contact points upon swelling of said elastomer restraining means.

6. The device of claim 5 wherein the elastomer restraining means is butyl rubber.

References Cited

UNITED STATES PATENTS

| | | | |
|---|---|---|---|
| 1,861,989 | 6/1932 | Trebitsch | 200—61.03 |
| 1,995,107 | 3/1935 | Schlatter | 200—61.06 |
| 2,966,060 | 12/1960 | Bradbury | 200—61.06 |
| 3,200,388 | 8/1965 | Uhlig | 200—61.04 XR |

ROBERT K. SCHAEFER, *Primary Examiner.*

H. O. JONES, *Assistant Examiner.*

U.S. Cl. X.R.

200—61.08